INVENTORS.
Harry L. McFeaters
Ira W. Lakin
BY
Green, McCallister & Miller
THEIR ATTORNEYS July 21, 1964  H. L. McFEATERS ETAL  3,141,916
PLANT INSTALLATION FOR SERVICING FURNACE VESSEL
Filed July 5, 1960  3 Sheets-Sheet 2

INVENTORS.
Harry L. McFeaters
Ira W. Lakin
BY
Green, McCallister & Miller
THEIR ATTORNEYS July 21, 1964  H. L. McFEATERS ETAL  3,141,916
PLANT INSTALLATION FOR SERVICING FURNACE VESSEL
Filed July 5, 1960  3 Sheets-Sheet 3

INVENTORS.
Harry L. McFeaters
Ira W. Lakin
BY

THEIR ATTORNEYS

United States Patent Office 3,141,916
Patented July 21, 1964

3,141,916
PLANT INSTALLATION FOR SERVICING
FURNACE VESSEL
Harry L. McFeaters, New Castle, and Ira W. Lakin, Volant, Pa., assignors to Pennsylvania Engineering Corporation, New Castle, Pa., a corporation of Pennsylvania
Filed July 5, 1960, Ser. No. 40,605
5 Claims. (Cl. 266—13)

This invention relates to a plant installation including apparatus for servicing a furnace vessel and particularly a tiltably-mounted vessel in the nature of a converter vessel.

A phase of the invention relates to the provision of a plant layout for facilitating utilization, repair and maintenance of a tiltable furnace vessel. Another phase relates to an installation employing a wheeled truck in the nature of a self-propelled truck that operates on track rails and is adapted to seat a working or servicing unit and preferably alternately to seat a ladle. A third phase of the invention relates to positioning or mounting structure for a tiltable furnace vessel which will make practical the utilization of a wide gauge truck in an operative relationship therebeneath and which will provide means for protecting actuating supply means, sides of the truck, side rail mountings, and in general, a side area of the construction from trash and debris as well as from heat of the vessel.

This application is a continuation-in-part of our application No. 849,207 of October 28, 1959, entitled "Furnace Installation."

It has thus been an object of our invention to provide a new and improved plant installation for servicing a tiltable furnace vessel;

Another object has been to devise a servicing construction for a furnace vessel which is flexible in its utilization;

Another object of our invention has been to provide a plant layout for a typical furnace vessel which has means for protecting important parts thereof or opposite side areas beneath the vessel from debris as well as from heat generated by the vessel;

A further object of our invention has been to devise a servicing or working unit for a furnace vessel that may be seated upon a wheeled truck therebeneath and that has means for facilitating the removal of and the secure positioning of a section of the vessel, after it is removed, and while it is being moved to a servicing station;

These and other objects of our invention will appear to those skilled in the art from the specification, the claims, and the drawings.

In the drawings, FIGURE 1 is an end elevation in partial section of a plant layout or servicing installation of our invention, taken from the side of a tiltable furnace vessel; in this view, a teeming ladle is shown in position in alignment beneath the furnace vessel and the vessel is shown in a substantially vertical position with its nose portion or section pointed downwardly to indicate the completion of a pouring of refined metal from the vessel;

Figure 2:
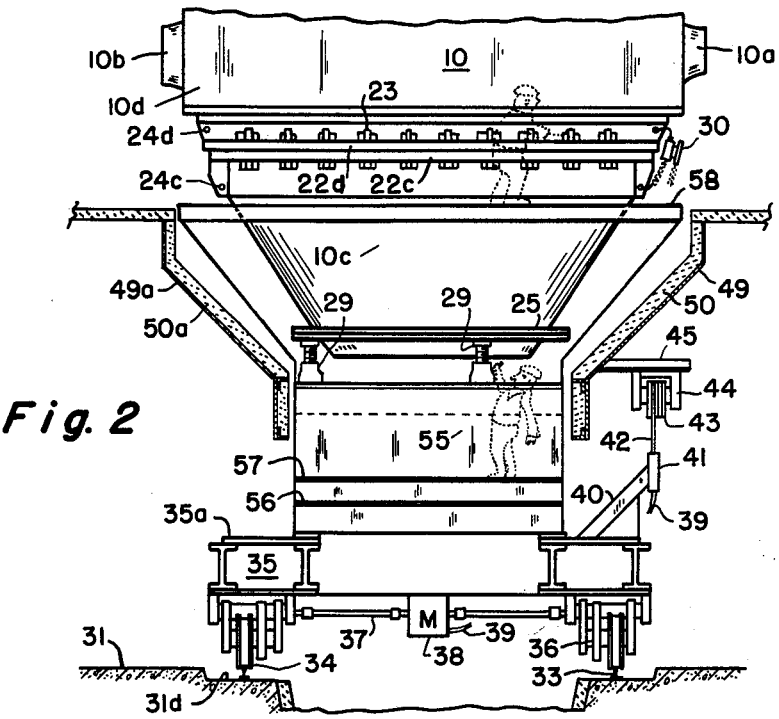
FIGURE 2 is a fragmental end view in partial section of the structure of FIGURE 1, but showing a working or servicing unit in position to facilitate the removal of a bottom section or portion of the vessel for its maintenance and repair.
Figure 3:
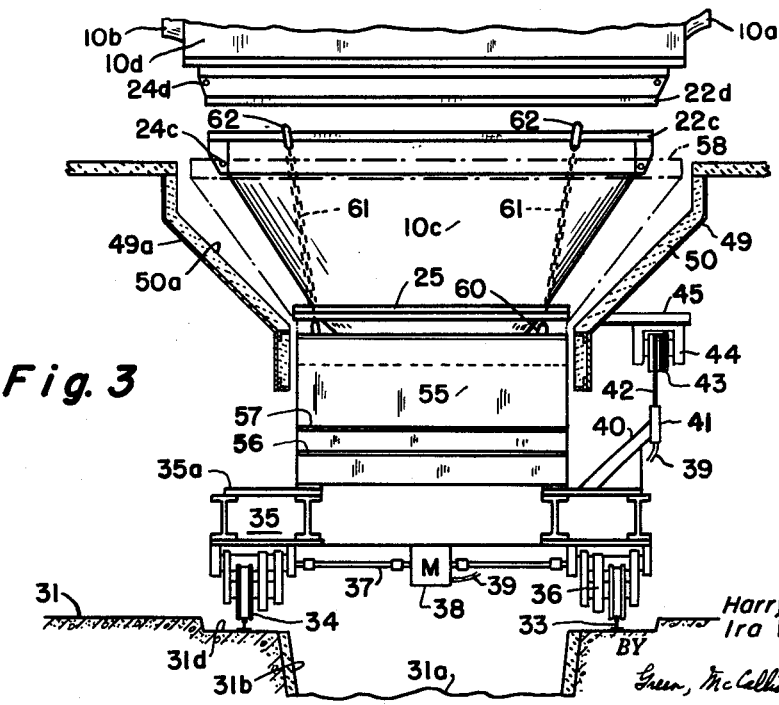
FIGURE 3 is a fragmental end section similar to FIGURE 2, but showing a removed furnace section or portion seated upon the working or servicing unit and ready for removal to a servicing station.
Figure 4:
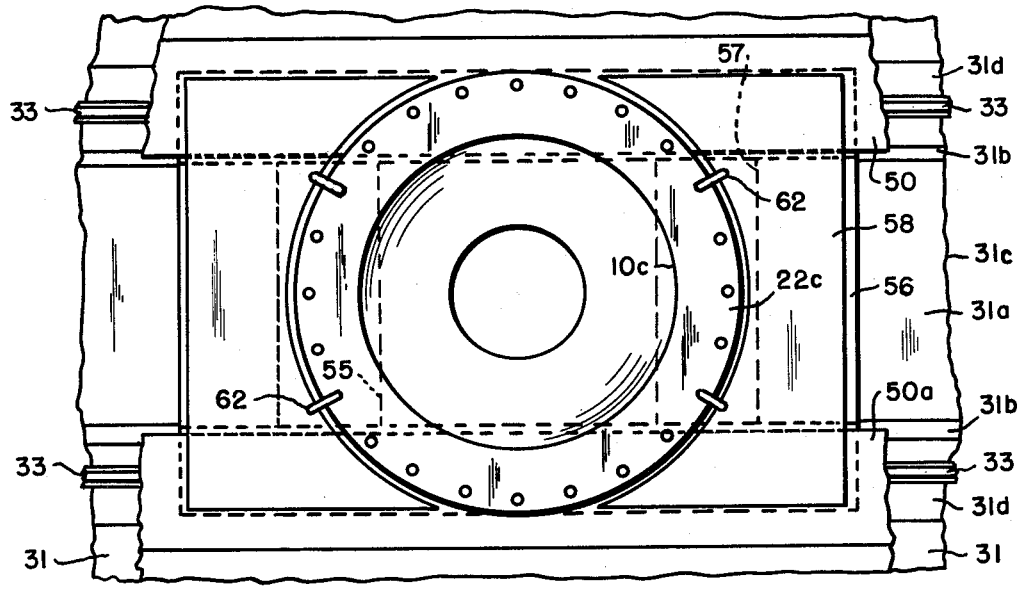
FIGURE 4 is a fragmental horizontal section taken along the line IV—IV of FIGURE 1 and illustrating in plan the relationship of a lower section of the vessel with respect to opposed refractory-faced deflector means.
Figure 5:
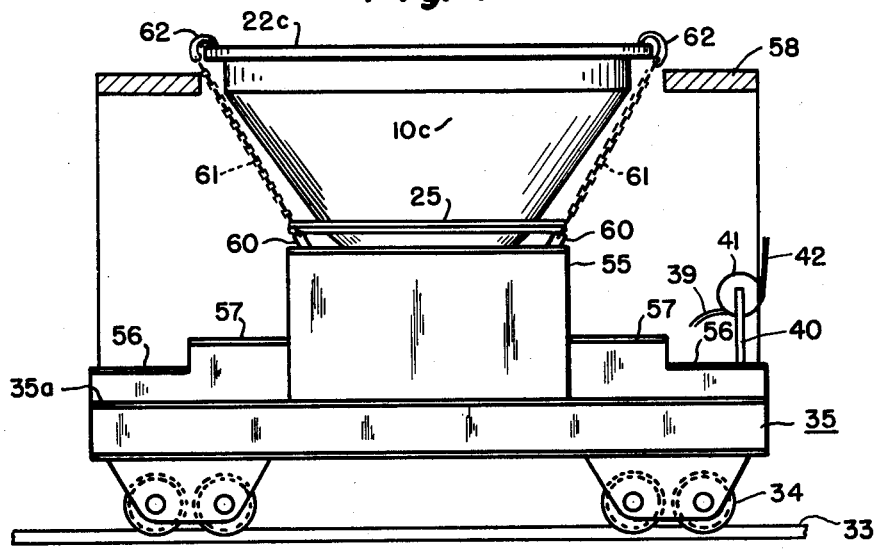
FIGURE 5 is a side view in elevation of the wheeled truck of FIGURE 1 with the working or servicing unit of FIGURE 2 seated thereon and with a removed section of the furnace on such working unit in the carrying position of FIGURE 3.
Figure 6:
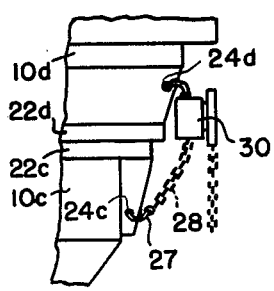

And, FIGURE 6 is a fragmental view in elevation showing hoist means for supporting the section of the furnace that is to be removed while bolt and wedge assemblies of parting flanges are removed, and for lowering the removed section to a carrying position on the working or servicing unit of FIGURES 2, 3 and 5.

Figure 1:
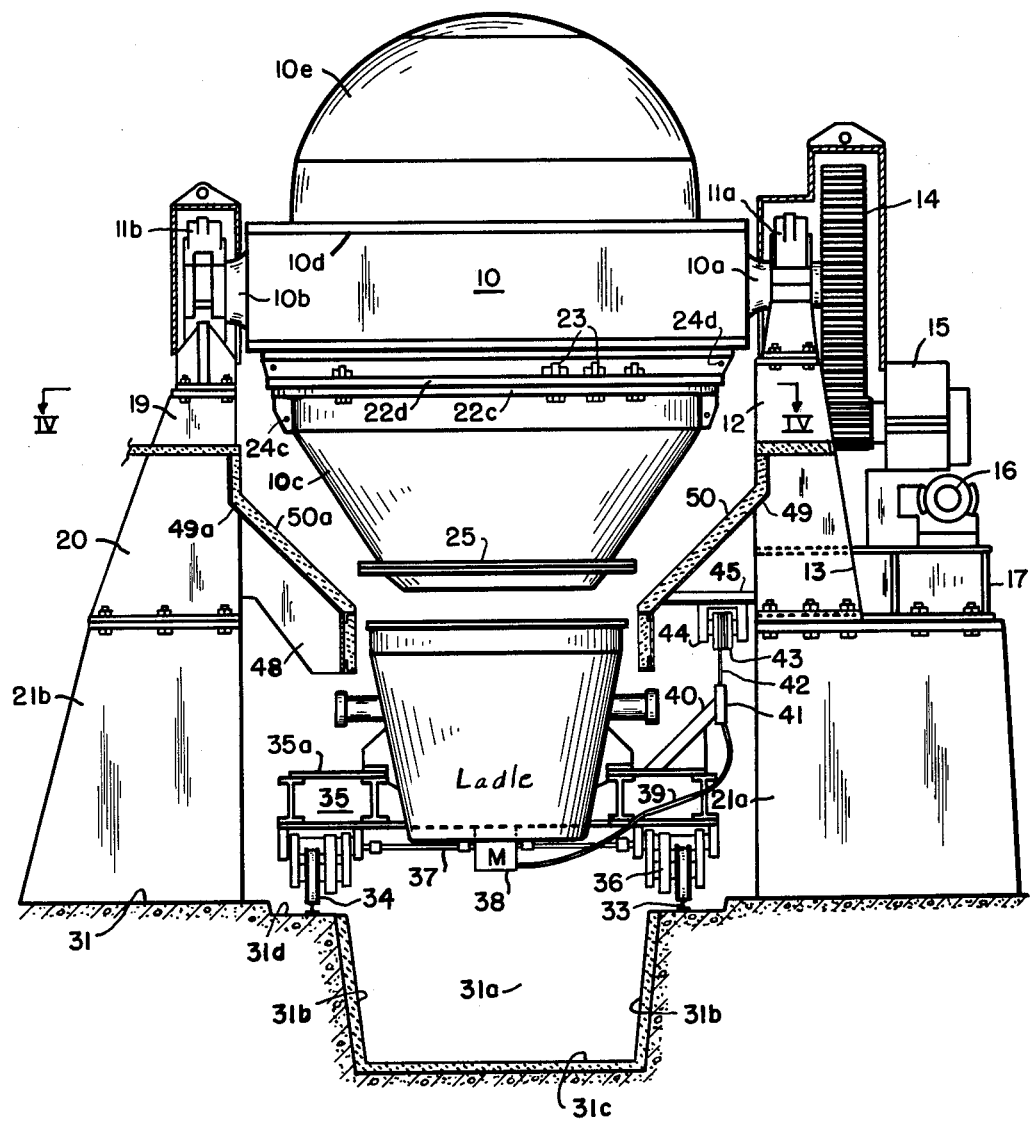

Referring to FIGURE 1 of the drawings, a conventional refractory lined furnace vessel 10, whose sections are secured together by bolt and wedge assemblies at parting flanges, is indicated as having a pair of oppositely-projecting trunnion shafts 10a and 10b that are journaled in bearing housings 11a and 11b. The vessel 10 is also indicated as having a nose section or portion 10c, an intermediate section 10d, and a bottom section 10e, but may have additional sections depending upon its size or capacity. The trunnion shaft 10a is shown as driven by a spur drive wheel 14 and speed reducing unit 15, through an electric motor drive and magnetic brake unit 16. The latter is shown secured on a platform 17 that projects from a side of the installation.

The bearing housing 11a is shown mounted on an upper stand 12 which is, in turn, positioned on an intermediate stand 13, and on a lower stand or working-pit-defining wall 21a, all of which provide a vertical side wall in a spaced relation along one side of the vessel 10. In a like manner, the bearing housing 11b is carried on an upper stand 19, an intermediate stand 20 and a lower stand or vertical wall 21b, all of which define an opposed substantially vertical wall in a spaced relationship along an opposite side of the vessel 10. It will be noted that the opposed stands or vertical walls 21a and 21b define a working pit below the vessel 10 that is at least equal in width or spacing to the maximum width or dimension of the vessel 10, indicated in FIGURE 1, as between its trunnions 10a and 10b.

A plant kitchen or working level floor 31 has an open portion 31a in a spaced relation beneath the vessel 10. A pair of opposed side walls 31b extend downwardly from opposite sides of the open portion 31a in the floor 31, and with a bottom wall 31c, define a refractory lined trash pit. The floor 31 also has a pair of slightly downwardly-offset side-positioned shelf portions 31d along its open portion 31a and connecting with the vertical sides of the walls 31b to define a mounting for a pair of track rails 33 which are laid longitudinally therealong.

The wheeled or self-propelled truck 35 is shown as having flanged wheels 34 which rest on track rails 33, so that the truck may be moved along such rails into and out of an aligned position beneath the vessel 10. For example in this manner, the teeming ladle, after refined metal has been poured into it from the vessel 10, may be moved to a suitable servicing position. Also, if a working unit 55 is seated thereon, this unit may be moved to another suitable maintenance and servicing station for the section or portion of the vessel 10 which is carried thereon.

The wheels 34 are driven through reduction gears 36 and shaft 37 by a motor drive unit, such as an electric motor 38 that is carried under the frame of the truck 35. This motor, as shown particularly in FIGURES 1 and 2, is energized by an electric cable 39 which leads from a collector disc 41. The disc 41 is mounted in an insulated relationship on an upwardly-outwardly side-inclining mast 40 which is secured to the truck 35. A flexible electric pay-out cable 42 is electrically connected at one end to the collector 41 and at its other end is wound on a payout drum 43 which carries a pull-back spring to resiliently resist pay-out as the truck 35 moves along its rails.

The drum 43 is rotatably positioned on a mount 44 that is carreid by a horizontal frame portion 45 that extends from the inside of one opposed metal deflector part 49, and at its other end, is secured to the platform 17. The truck 35 has a frame provided with upwardly-projecting side members and a top member to define a seat 35a, alternately for a ladle, such as shown in FIGURE 1, and for a working or servicing unit 55, such as shown in FIGURE 2.

Metal deflector or shield members 49 and 49a which, at their upper ends, are mounted between the side stands of the installation, project inwardly-downwardly in a converging manner along and in a spaced relation with a bottom portion of the vessel 10, and in such a manner as to define protected opposed side areas along the furnace and above the truck 35. In this manner, the shelf portions of the track area 31d, as well as the current supply or actuating means for the operation of the truck 35, are protected from the fall of debris and trash as well as from the working heat of the vessel. It will be noted that the side deflectors project inwardly up to or slightly beyond the shelves 31d. In view of the intense heat involved, the deflector members 49 and 49a are faced on their inner sides with refractory tile or linings 50 and 50a. It will be noted (see FIGURE 1) that the deflector 49a has a reinforcing frame 48 that is carried by the stand 20 and that takes the place of the member 45 that is secured to the other deflector member 49. This deflector construction importantly makes practical the employment of a wide gauge track (such as shown), in that it protects the track from the fall of molten melt thereon, for example, during pouring of the vessel 10.

FIGURE 1 shows how the truck 35 will be employed for accomplishing normal operation of the vessel 10, while FIGURE 2 illustrates how the truck may be utilized when one vessel is to be repaired and particularly, where a section thereof is to be serviced as, for example, to replace its refractory lining. It will be noted that the platform frame of the truck 35 is adapted to receive a unit for servicing the vessel which may include a teeming ladle for receiving molten metal therefrom and also a working frame or structure having vertically-spaced platforms for the workmen and providing a support for a removed section of the vessel, so that the removed section may be taken to a convenient location for replacement or repair. For the purpose of illustration, this FIGURE 2 illustrates the removal of the nose section 10c. For this purpose, the ladle vessel of FIGURE 1 is removed to a suitable station on the truck 35 and the working or servicing unit 55 is then placed on truck seats 35a, as by an overhead crane or hoist, and carried by the truck to the aligned position of FIGURE 2, beneath the vessel 10.

The unit 55, as particularly shown in FIGURES 2, 3 and 5, is made up of strong metal sections to provide an upwardly-projecting support frame defining an upper support portion or platform for the section of the vessel to be removed and transported. As shown particularly in FIGURE 2, it has a pair of upwardly-outwardly projecting opposed side frames which define an upper pair of horizontal working platforms or walkways 58 in the spacing between the opposed side deflectors 49 and 49a and the vessel 10. Workmen may stand on the upper platforms 58, adjacent parting flanges, such as 22c and 22d of the vessel 10, whose bolt and wedge assemblies 23 are to be removed (see the dotted-in man of FIGURE 2).

In addition, the unit 55 has pairs of staggered or stepped walkways or lower platforms 56 and 57 at its opposite front and back sides or ends (see FIGURE 5 and the dotted-in man of FIGURE 2), so that workmen may stand or walk thereon, for example, for the purpose of positioning and operating jack screws 29 when one vessel section 10c is to be removed from or remounted on the vessel 10. As shown, jack screws 29 may rest upon the unit 55 and abut lower flanges 25 of the section 10c being handled. Preferably, however, at least a pair of portable chain hoists 30 (see FIGURES 2 and 6) are employed by the workmen on the platform structure 58 (see the dotted-in man of FIGURE 2), although this operation may be fully carried out by either the jack screws 29 or the hoists or by both supplementing each other. The jack screws 29 may be hand-operated or power-operated by means of levers, fluid cylinders, etc.

As shown in FIGURE 6, each hoist unit 30 may have its upper housing hook connected or suspended from an eyelet 24d of an intermediate portion 10d of the furnace which is still integral with the trunnion support and may have the hook 27 of its chain 28 connected to an eyelet 24c carried by side lugs of the frame structure of the vessel section 10c that is to be removed, so that the hoists may hold the flanges 22c and 22d of the sections 10c and 10d together during the removal of their bolt and wedge assemblies 23 and then after all the latter have been removed, may be employed to lower the removed section 10c upon the upper supporting face or surface of the unit 55.

As shown particularly in FIGURE 3, the removed section 10c may be securely held on the working or servicing unit 55 during its transportation to a servicing station on the truck 35 by means which consists of a pair of clamp-on chains 61 which at their lower ends extend from eyelets 60 on the upper face of the unit 55 and which at their upper ends carry latch-on hooks 62, so as to engage an upper annular flange 22c of the section 10c that has been removed. The hooks 62 may engage within bolt or wedge openings in the flange 22c.

What we claim is:

1. Servicing apparatus for a tiltable refractory-lined melting furnace vessel in the nature of a converter having a pair of trunnions projecting from opposite sides thereof and having an open mouth portion that faces substantially upwardly when the vessel is in a metal refining position and that faces substantially downwardly when the vessel is in a molten metal pouring position, wherein the vessel is constructed of transverse sections having means releasably-securing them together with respect to each other, wherein stands are positioned on a floor beneath the vessel in a transversely-spaced relation on opposite sides of said vessel and carry the trunnions to tiltably position the vessel in a spaced relation above the floor, and wherein track rails are positioned on the floor and extend along the spacing between the stands at substantially right angles to the trunnions of the vessel which comprises, a truck having wheels mounted along its opposite side portions to engage the track rails for movement therealong between the stands into a cooperating working position beneath the vessel and between the vessel and a servicing station, said truck having an upwardly-projecting frame thereon provided with a top seat, a working unit adapted to be removably-positioned on said top seat and carried by said truck between the servicing station and the cooperative working position beneath the vessel, said working unit having an upwardly-projecting support frame provided with an upper support portion to receive a section to be removed from the vessel for transportation between the vessel and the servicing station, said support frame having upper and lower side-positioned walkways to enable workmen to release the means releasably-securing a section of the vessel that is to be removed therefrom for servicing; said upper support portion of said frame being constructed to position means for holding the section to be removed in position with respect to the vessel while workmen release the releasable-securing means for removing the section, and to thereafter removably-receive and support the removed section thereon; and means carried by said working unit to engage the removed section of the vessel and securely hold it in position on said upper support portion of said frame while the section is being transported from and to the vessel by said truck.

2. Servicing apparatus as defined in claim 1 wherein, refractory-lined side deflectors are positioned in the spacing between the stands and cooperate with the vessel and said truck and project inwardly beyond opposite sides and the wheels of said truck to protect the side-mounted wheels of said truck and the track rails from the fall of debris from the vessel.

3. Servicing apparatus as defined in claim 1 wherein, said truck has electric motor means carried thereby for moving it along the track rails, a mast projects upwardly and outwardly from a side of said truck and carries a collector disc, a cable payout drum is operatively-positioned within the spacing between the stands in a spaced relation with respect to said truck and in substantial alignment with said collector disc, a flexible energy-supplying electric cable is carried by said drum and is connected to said disc for supplying electric energy to said motor during movement of said truck, and refractory-lined deflector means is positioned in the spacing between the stands in a cooperating relation with the vessel to project over and above said drum and said disc and inwardly of the opposite side portions of said truck to protect them and the side-mounted wheels of said truck and the track rails from the fall of debris from the vessel.

4. Serviceing apparatus for a tiltable refractory-lined melting furnace vessel in the nature of a converter having a pair of trunnions projecting from opposite sides thereof and having an open mouth portion that faces substantially upwardly when the vessel is in a metal refining position and that faces substantially downwardly when the vessel is in a molten metal pouring position, wherein the vessel is constructed of transverse sections having means releasably-securing them together with respect to each other, wherein stands are positioned on a floor beneath the vessel in a transversely-spaced relation on opposite sides of said vessel and carry the trunnions to tiltably position the vessel in a spaced relation above the floor, and wherein track rails are positioned on the floor and extend along the spacing between the stands at substantially right angles to the trunnions of the vessel which comprises, a truck having wheels mounted along its opposite side portions to engage the track rails for movement therealong between the stands into a cooperating working position beneath the vessel and between the vessel and a servicing station, said truck having an upwardly-projecting frame thereon provided with a top seat, a working unit adapted to be removably-positioned on said top seat and carried by said truck between the servicing station and the cooperative working position beneath the vessel, said working unit having an upwardly-projecting support frame provided with an upper support platform to receive a section of the vessel to be removed from the vessel for transportation between the vessel and the servicing station, said support frame having an upwardly-outwardly-projecting side frame which defines an upper working walkway to enable workmen to release the means releasably-securing a section of the vessel that is to be removed therefrom for servicing, said support frame having lower level stepped front and back side-positioned walkways to enable workmen to operate means for holding the section to be removed in position with respect to the vessel before the releasable-securing means is released to remove the section, said support platform being constructed to thereafter removably-receive and support the removed section of the vessel thereon, and means carried by said working unit to engage the removed section and hold it in position on said support platform while the section is being transported from and to the vessel by said truck.

5. Servicing apparatus as defined in claim 4 wherein said upwardly-projecting frame of said truck defines a central open portion with said top seat.

References Cited in the file of this patent

UNITED STATES PATENTS

| | | |
|---|---|---|
| 86,303 | Holley | Jan. 26, 1869 |
| 331,267 | Williamson | Nov. 24, 1885 |
| 332,636 | Butz | Dec. 15, 1885 |
| 333,286 | Davy | Dec. 29, 1885 |
| 663,946 | Waldburger et al. | Dec. 18, 1900 |
| 2,696,663 | Wright | Dec. 14, 1954 |
| 2,803,450 | McFeaters | Aug. 20, 1957 |
| 2,836,309 | McFeaters | May 27, 1958 |
| 2,889,597 | Griffiths | June 9, 1959 |
| 3,026,102 | McFeaters | Mar. 20, 1962 |